United States Patent [19]
Reece

[11] 3,870,640
[45] Mar. 11, 1975

[54] FILTER WITH VIBRATION OF SCREEN
[75] Inventor: Thomas L. Reece, Texas Twp., Kalamazoo County, Mich.
[73] Assignee: Dover Corporation, Kalamazoo, Mich.
[22] Filed: Nov. 12, 1973
[21] Appl. No.: 414,786

Related U.S. Application Data
[62] Division of Ser. No. 212,461, Dec. 27, 1971, abandoned.

[52] U.S. Cl. .............................. 210/388, 210/497.1
[51] Int. Cl. ............................................. B01d 33/00
[58] Field of Search ........ 55/178, 277, 292; 210/19, 210/232, 251, 384, 388, 407, 497.1

[56] References Cited
UNITED STATES PATENTS
| | | | |
|---|---|---|---|
| 2,392,666 | 1/1946 | Harris | 210/388 |
| 2,475,561 | 7/1949 | Cooperider et al. | 210/497.1 X |
| 3,161,591 | 12/1964 | Petter et al. | 210/251 |
| 3,447,690 | 6/1969 | Kracklauer | 210/388 X |
| 3,543,934 | 12/1970 | Raymond | 210/232 X |

Primary Examiner—Samih N. Zaharna
Assistant Examiner—Robert H. Spitzer
Attorney, Agent, or Firm—Woodhams, Blanchard and Flynn

[57] ABSTRACT

A filter apparatus having means for maintaining a filter element in a state of at least substantially continuous agitation. There is provided a tank having a hollow filter element positioned therein. The liquid being filtered is introduced into the tank exteriorly of the filter element, passes through the filter element in a radially inward direction and the filtered liquid then is withdrawn from the interior of the filter element. At least a portion of the filter element is movably related to the tank and a vibrator unit is provided on the filter element. Operation of the vibrator unit causes agitation of the filter element within the tank and thereby maintains the filter element in a state of constant agitation.

It is often convenient to drive the agitating unit by compressed air and if so a pair of hoses will be connected to the agitator unit. Preferably, such hoses will be brought through the ring by which the filter element is supported and then along the length of the filter element to the agitator unit, whereby the filter-agitator-hose assembly may be made in a single, easily replaceable unit.

6 Claims, 4 Drawing Figures

FILTER WITH VIBRATION OF SCREEN

This application is a division of Application Ser. No. 212,461, filed Dec. 27, 1971, now abandoned.

FIELD OF THE INVENTION

The invention relates to liquid filters and particularly to a type thereof in which the filter element is maintained in a state of continuous, or at least frequent intermittent, agitation.

BACKGROUND OF THE INVENTION

In a majority of filtering situations a constant problem has been to prevent the filter element from becoming obstructed whereby to inhibit or terminate the filtering operation. Particularly in the filtering of thixotropic liquids or those having high solids content, such as colloidal gels, lime and clay slurries, starch solutions, clay coatings and the like, the solids tend to coalesce, coagulate or collect on the filter element unless subjected to a considerable degree of vibration or other agitation. This tends to make the filtration of such liquids difficult.

To deal with this problem, it is already known in the filtering of materials as aforesaid to shake the filter element in an open-vessel system, but this has the known disadvantages of causing foaming of the liquid. The bubbles so created, where the material being filtered is a paper coating material, often then appear on the finished paper sheet as defects in the coating thereof. However, attempts in the past to carry out the filtering of such material in a closed system and under pressure to prevent foaming having resulted in almost immediate plugging of the filter and hence, the filtering of such materials under pressure, i.e., in a closed system, was long considered impossible. Further, the shaking of the filter unit often caused rapid deterioration thereof resulting in high maintenance costs.

In this state of the art, there appeared U.S. Pat. No. 3,161,591 to Petter et al, which achieved somewhat of a breakthrough in the art by vibrating the liquid being filtered and thereby making possible the filtering of materials as above mentioned while retaining same in a closed, pressurized system. This eliminated the foaming above mentioned and has now been used almost exclusively for several years in the filtering of paper coating materials.

However, in a constant attempt to improve apparatus for this purpose, further research has been carried out, particularly with a view to devising a filter to filter under pressure such materials as paper coatings but to have a somewhat longer operating period before the necessity of cleaning and a wider range of applicability than prior known equipment including that of aforementioned U.S. Pat. No. 3,161,591.

Accordingly a principal object of the invention is to provide means for agitating a filter element and thereby obtaining a high degree of protection from filter clogging for a given size of filter and given amount of power input.

A further object of the invention is to provide means for agitating a filter unit wherein the filtering operation is carried out in a closed system under pressure.

A further object of the invention is to provide apparatus, as aforesaid, in which the filter, the agitator, and the means supplying pressure fluid to the agitator may all be made in a single convenient integral unit which as a unit may be readily inserted and withdrawn from the filter housing.

A further object is to provide a filter unit, as aforesaid, wherein the filter element may be inserted as a replacement part into the casing of filters made according to said U.S. Pat. No. 3,161,591.

A further object of the invention is to provide apparatus, as aforesaid, wherein the filter element may be effectively agitated from a single mechanical source.

A further object of the invention is to provide apparatus, as aforesaid, which will be simple to manufacture and to maintain in good operating condition over a long period of time and under conditions of rigorous service.

A further object of the invention is to provide apparatus, as aforesaid, which will be sufficiently simple as to be inexpensive to manufacture and to install.

Other objects and purposes of the invention will be apparent to persons acquainted with apparatus of this general type upon reading the following specification and inspecting the accompanying drawings.

SUMMARY OF THE INVENTION

The objects and purposes of this invention are met by providing a filter apparatus having means for maintaining a filter element in a state of substantially continuous, or at least frequent intermittent, agitation. There is provided a tank or casing having a hollow filter element positioned therein. The liquid being filtered is introduced into the tank exteriorly of the filter element, passes through the filter element in a radially inward direction and the filtered liquid then is withdrawn from the interior of the filter element. At least a portion of the filter element is movably related to the tank and a vibrator or agitation unit is provided suitably on the filter element. Operation of the agitating unit causes agitation of the filter element within the tank and thereby maintains the filter element in a state of constant, or at least frequent intermittent, agitation.

It is often convenient to drive the agitating unit by compressed air and if so a pair of air conducting hoses will be connected to the agitator unit. In such case the hoses may be positioned between the filter unit and tank or they may be placed inside the filter unit. In either case, if they are mounted substantially rigidly with respect to the filter unit, the hoses will have little or no tendency to agitate the liquid. The hoses, filter unit and agitator may be made in a single integral unit to facilitate the insertion thereof into and removal thereof from the tank. If the filter unit or at least a portion thereof is subjected to oscillatory vibration on a stable axis there will be, unlike in the case of said U.S. Pat. No. 3,161,591, at the most little vibration applied by the filter unit to the liquid body itself.

DETAILED DESCRIPTION

Figures 1, 2:
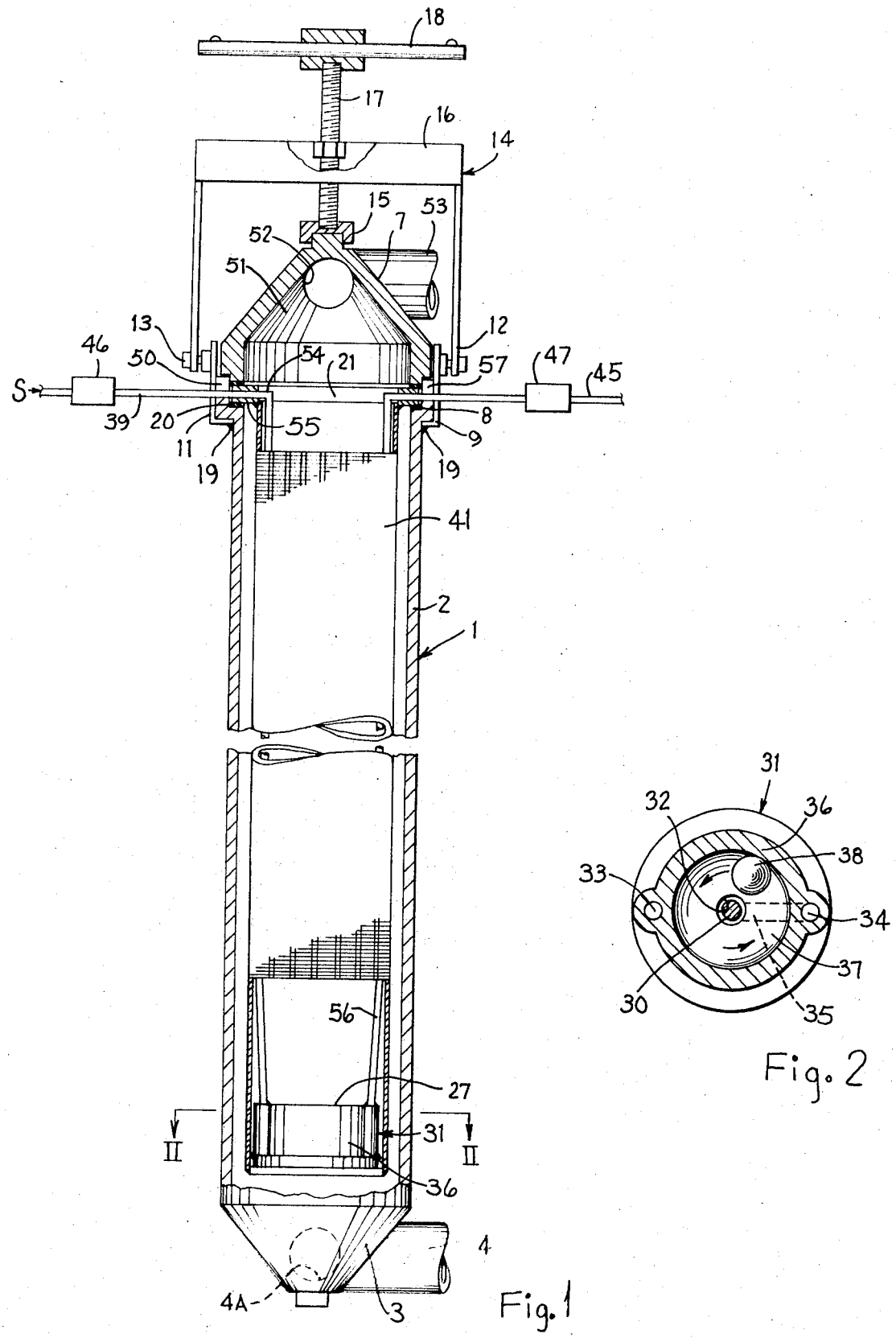
FIG. 1 is a partially broken, central sectional view of a filter unit embodying the invention, the same utilizing an air driven mechanical agitator.
FIG. 2 is an enlarged section taken on the line II—II of FIG. 1.
Figure 3:
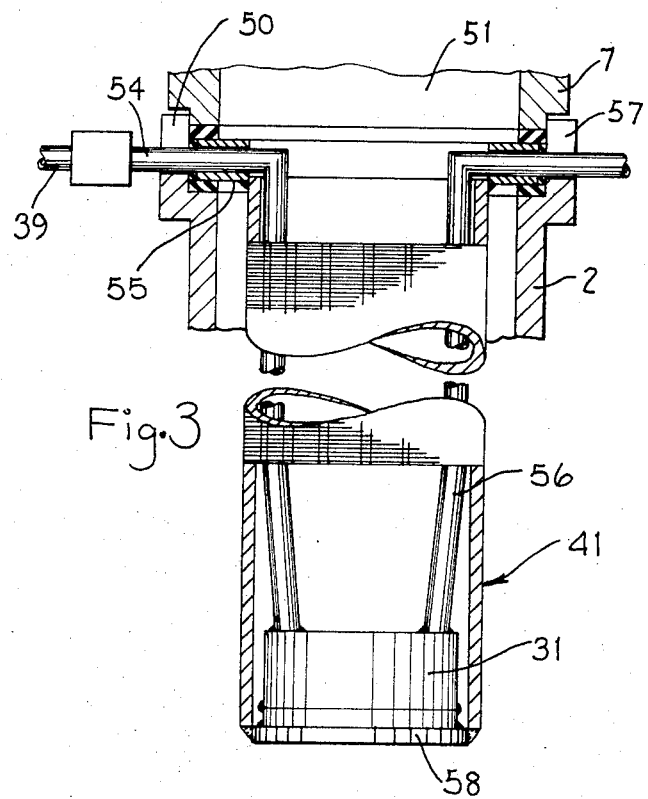
FIG. 3 is an enlarged, fragmentary central sectional view of the filter unit of FIG. 1.

Referring now to FIGS. 1, 2 and 3 for a specific embodiment by which the invention may be set forth in detail, there is provided a filter apparatus having a casing or housing 1 (FIG. 1) which in this embodiment includes a cylindrical sidewall portion 2 and a bottom, here defined by bottom end closure member 3. An inlet, indicated in broken lines at 4, communicates with the interior of said housing 1 through an aperture 4A and is affixed thereto in sealing relation therewith in any convenient manner.

An annular plate, or flange, 55 is fixed, removably, to the upper end of the cylindrical portion 2 and is sealed with respect thereto.

In the particular embodiment shown, the annular plate 55 is fixed and sealed to the upper end of the cylindrical sidewall 2 by a cap 7 which clamps the plate 55 in position as shown against a step 8. Any convenient hold-down means may be used, here shown as a pair of hooks 9 and 11 pivoted to the ends 12 and 13, respectively, of a bail 14. The crossbar 16 of the bail 14 threadably receives a screw 17 which can be tightened at 15 against the cap 7 by a handle 18. If desired, the lower ends of the hooks 9 and 11 may be permanently fastened, as by welding, at points 19 to the housing 1. If desired, suitable annular seals 20 may be interposed between the annular plate 55 and the cap 7 and step 8.

The cap 7 is hollow, defining therewithin a head chamber 51. An outlet conduit 53 communicates with the chamber 51 through an aperture 52 and is fixed to the cap 7 in sealing relation therewith in any convenient manner.

The plate 55 has a central opening 21.

A filter element 41 is connected to said plate 55 and extends downwardly, in this embodiment concentrically, into the interior of the housing 1. The filter element 41 has an open upper end communicating through the opening 21 with the head chamber 51 and thence with the outlet 52.

The filter element 41 may be of any conventional type such as stainless steel wires. The filter unit is closed at its bottom end, here by the closure disk 58 and is open at its upper end to the chamber 51 and thence to the outlet of the filter. The bottom 58 of the filter element may be either a solid plate as indicated or may be the same as the sides, if preferred, and is rigidly fixed to the sides by any convenient means, such as welding.

A mechanical agitator, or vibrator, 31 is firmly affixed to the filter unit on, or at least adjacent to, the lower end thereof, preferably on the bottom member 58 as shown and as by a bolt connection.

This embodiment utilizes an air-driven type of agitator such as shown in U.S. Pat. NO. 3,161,591, to which attention is invited for a more complete disclosure of its details. Briefly, however, said agitator (FIGS. 1 and 2) comprises a housing 36 having an annular chamber 37 therein containing a ball 38 adapted for orbiting around said chamber.

Air under pressure is introduced into said annular chamber 37 through an opening 33 and is exhausted from the chamber through a center opening 32 and thence by passageway indicated in broken lines at 35 to an outlet opening 34. An air inlet conduit 39 is connected to the inlet 33 of the agitator 31 by a semiflexible hose 54. More particularly, the supply conduit 39 connects through any convenient coupling means to the inlet conduit 54 which passes through the wall of the filter housing 1 through a suitable slot 50 in the housing sidewall 2 and opening in the flange 55 and extends downwardly on the inside of the filter element to the vibrator. The vibrator 31 is fastened to the lower end of the conduit 54 for support and communication with the inlet port thereof. The exhaust opening 34 of the agitator 31 is connected by a similar hose 56 to the exhaust conduit 45. More particularly, the exhaust conduit 56 is similarly fastened in communication with the exhaust port of the vibrator 31, extends upwardly through the filter and thence through the opening in the flange 55 and exits through a slot 57 in the upper end of the housing sidewall 2. Said slot 57 is preferably located diametrically opposite the slot 50. Said conduit 56 is then connected to the low pressure side of the pressure system. Suitable valves 46 and 47 may be provided in the conduits 39 and 45 for controlling air flow therethrough. Air is supplied to line 39 from a source S such as a compressor. The air passing through the chamber 37 effects orbiting of the ball in the chamber and orbiting of the ball 38 causes a vibration of the agitator housing 36 thereby of the filter element 41.

In this embodiment the filter element 41 is connected rigidly to the flange structure 55 which is then clamped rigidly between the cap 7 and body portion 2. Thus, the resiliency of the filter element itself is relied upon to permit the necessary relative movement between at least the lower portion of the filter element and the tank.

The illustrated embodiment is adapted for the building of the filter unit, agitator and supply hoses for the agitator in a single integral assembly, whereby such assembly may be as a single unit conveniently and efficiently installed and removed from the tank structure.

OPERATION

The operation of the apparatus has been indicated somewhat above but will be dealt with further for a more complete understanding of the invention.

In operation, the liquid to be filtered is introduced through the conduit 4 into the housing 1, passes radially inwardly through the filter 41 thence through the opening 21 into the chamber 51 and out through the outlet conduit 53. This is a normal filtering operation which will be readily understood by those skilled in the art and is essentially the same set forth in the above mentioned U.S. Pat. No. 3,161,591.

To utilize the agitator of the invention, fluid under pressure, usually air, is introduced through the inlet conduit 39 and is conducted by the hose 54 to the inlet 33 of the agitator 31. This effects orbiting of the ball 38 as above mentioned and thereby creates a vibration in the plane of such orbiting. The air then escapes through the hose 56 to the exhaust conduit 45 and therethrough either to the low pressure side of the fluid pressure supply S, or, if the fluid is air, to the atmosphere.

Said vibration, created as above mentioned, causes a lateral movement of the lower end of the filter element 41. If any solids tend to deposit on the filter element, the agitation of the filter element will quickly loosen same and prevent any appreciable obstruction of the filter openings.

While any metal from which the filter 41 may be made will have some degree of resiliency usually sufficient to permit vibration of an amplitude sufficient to meet the purposes involved here, and even some ceramics may also be used for a similar unit, it will be appreciated that fatigue problems may be minimized by utilizing in the aforesaid filter unit a sufficiently resilient material that the amplitude of the flexing resulting from such vibrations will be well within the limits of elasticity of the material. Particularly, one presently known type of filter element utilizes an elongated resilient member coiled in a spiral form with axial irregularities between adjacent coils providing the filtering space thereof. Such unit is highly durable and well adapted for the purposes here in question.

It is possible to construct the filter unit, the agitator, the supply and exhaust conduits, and the mounting flange all as a single integral assembly, whereby same can be as a unit inserted into and removed from the filter tank 1. The entire assembly is fastened together by any suitable means, such as welding. Such an integral unit minimizes not only initial assembly and thereby manufacturing costs but, even more important, minimizes the cost of replacing a filter element and its associated parts. Thus, the filter unit and its associated parts may be initially installed and when desired subsequently removed and replaced by a single unitary filter unit, to avoid a situation wherein the filter unit, for example (or the agitator or the tubes), can be replaced only by substantially dismantling the entire apparatus, replacing the defective part and then reassembling the whole unit.

While the foregoing embodiment was described in terms of the plane of orbiting of the agitator ball 38 being substantially perpendicular to the longitudinal axis of the tank 1, it is recognized that it is possible to orient said plane to be parallel with the central axis of the tank, or at any other angle thereto, such as an angle of 45°, and preferably an angle having a large component parallel to such axis. In such event, the connection between the filter unit 41 and the plate 55 will be modified to permit relative axial movement therebetween rather than or in addition to the lateral movement above described.

However, while such modified apparatus is entirely operable and may have some advantages from the standpoint of agitation of the filter element it does not at present appear as desirable as the preferred embodiment above described in view of mechanical problems of mounting the filter element which appear to exist in such modified apparatus without presently discernible compensating advantages in operation.

Figure 4:
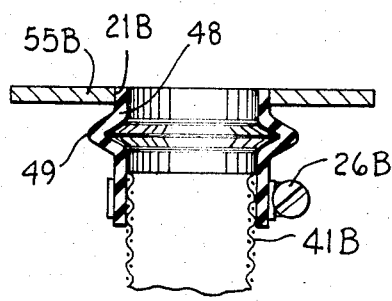
FIG. 4 is an enlarged fragment of FIG. 1 showing a modification.

FIG. 4 discloses a modified flexible mounting for the filter element. Portions of the apparatus of FIG. 4 similar to corresponding parts of the apparatus of FIG. 1 carry the same reference numerals as used in FIG. 1 with the suffix B added thereto.

In the modified embodiment of FIG. 4, a depending, tubular and flexible connecting member 48 is fixed at its upper end to the plate 55B in communication with the opening 21B in such plate. The tubular member 48 is connected to the plate 55B by any convenient means which may for example include an adhesive or other bond or suitable mechanical connection, not shown. At a point spaced downwardly along the length of the depending flexible tubular member 48, the top of the filter element 41B is connected thereto, here by a clamp 26B. However, it is contemplated that the filter element 41B may be secured to the flexible tubular member 48 by other means, for example by bonding thereto to provide a permanent, rather than removable, connection.

If desired, and for example in the case of a vibrator device 31 having at least a component of motion axially of the filter element, the tubular element 48 may be such as to accomodate axial motion of the filter element, as through provision of one or more bellows sections 49 along the length of the flexible member 48.

Also it will be recognized that although an air driven agitator has been utilized here to illustrate the invention, it is equally within the scope of the invention to provide agitators of other known types. For example, if for some reason it is not desired to have the hoses 54 and 56 within the tank 1, it is possible to provide an electrical vibrator of any convenient type in place of the mechanical agitator 31 and to lead the wires thereof either down the surface of the filter unit 41 or in by suitable flexible means through the bottom 58.

It is further contemplated that in a filter unit of the construction shown in FIG. 3, the oscillator unit 31 which is here designated for generating substantially radial vibrations may be replaced by any of several known vibrators adapted for creating oscillatory vibrations. Providing the flange structure 55 and the filter unit itself are constructed sufficiently rigidly that oscillatory motion appearing at the lower end of the filter unit will remain upon a reasonably stable axis, it will be appreciated that only minimal agitation will be applied to the liquid being filtered whereas the filter itself will still be agitated sufficiently to inhibit the deposit of solid materials thereon and to tend to dislodge those solid materials which do deposit thereon. This extends the usefulness of the concept of the invention to at least a certain number of cases where because of the physical instability of the liquid itself or of the solid material being carried thereby it is desirable to minimize the vibration applied to the liquid while continuing to apply such vibration to the filter unit itself as is necessary to keep same clear of solid deposits thereon.

Although particular preferred embodiments of the invention have been disclosed in detail for illustrative purposes, it will be recognized that variations of modifications of the disclosed apparatus, including the rearrangement of parts, lie within the scope of the present invention.

The embodiments of the invention in which an exclusive property or privilege is claimed are defined as follows:

1. In a filter apparatus for inhibiting the accumulation of solid material on or across the openings of a filter element and including a liquid line having vertically spaced first and second liquid conduits, a casing having a first end outlet closure member and a second end closure member each of which is provided with an aperture and means for respectively connecting the first and second end closure members to the first and second liquid conduits through said apertures in sealing relationship therewith whereby the casing closure members provide a closed liquid connection for carrying liquid between said conduits, the filter element being pendently disposed within the casing and having an upper end portion supported by the casing and in communication with the first conduit leaving a liquid chamber within the casing surrounding and extending below and beyond the lower free end portion of the filter element, the improvement comprising:

a vibrator directly fixed to and supported by the lower end portion of said filter element, said vibrator being spaced within said casing and from the upper end of the filter element;

means defining a pair of vibrator energizing passageways, said passageways including a pair of conduits in the casing and having ends essentially fixed with respect to the corresponding ends of said filter element, said conduits having lower ends connected to said vibrator and extending longitudinally of the filter element to source ends at the upper end of said filter element, said passageways further including conduits external of said casing for respective connection with external supply and return energy means; and flange means pendently supporting said filter element and releasably holding the upper end of said filter element onto said casing, said flange means incorporating intermediate portions of said passageways which interconnect said conduits in the casing to said conduits external of said casing;

said flange means, filter element, passageway means and vibrator defining a single integral unit for insertion into and removal from said casing.

2. The device of claim 1 wherein said filter element comprises a fixed length coil of spirally wound metal wire arranged to define filtering spaces therebetween and rigidly connected at one end thereof to said flange means, the spirally wound nature of said filter enhancing its capacity to withstand vibration of said vibrator mounted on the other end thereof without excessive fatiguing of the constituent metal of the filter element.

3. The device of claim 1 wherein said flange means comprises a radial flange having an opening therein receiving said filter element rigidly thereinto and a peripheral portion axially sandwiched and sealed between the upper of said closure members and an intermediate portion of said casing; and said intermediate passageway portions in said flange opening inboard of said peripheral portion to said axially extending conduits in said casing and opening radially of said flange through the external periphery thereof to said external conduits.

4. The device of claim 1 wherein said vibrator is fluid operated from a source of pressure fluid and the semiflexible conduits are hoses for supply and exhaust of pressure fluid to and from said vibrator.

5. The device of claim 1, wherein the upper end portion of said filter element is supported by and connected to the casing through a flexible coupling to allow movement of the entire filter element, the flexible coupling having a substantially cylindrical portion coaxially engaging the filter element.

6. In a filter apparatus for inhibiting the accumulations of solid material on or across the openings of a filter element and including a liquid line having vertically spaced upper and lower liquid conduits, a casing having a cylindrical intermediate portion containing said filter element and further having an upper end outlet closure member and a lower end closure member for respectively connecting said upper and lower liquid conduits through said intermediate casing portion to provide a closed liquid connection for carrying liquid between said liquid conduits, the filter element being pendently disposed within the casing and having an upper end portion supported by the casing and in communication with said upper liquid conduit leaving a liquid chamber within the casing surrounding and extending below and beyond the lower free end portion of the filter element, the improvement for filtration of liquid slurries with a high content of solids, particularly coalescent and adherent solids, comprising;

a self contained fluid operated vibrator supported by the lower end portion of the filter element and means fixedly connecting said vibrator to said filter element lower end portion, said vibrator terminating the lower end of the filter element and being spaced from the upper end of said filter element and out of contact with the casing, so as to be pendently supported in said casing by said filter element;

fluid supply and exhaust conduits having opposite ends fixed with respect to corresponding ends of said filter element and each having one end connected to said vibrator for energizing said vibrator with pressure fluid, said supply and exhaust conduits extending upwardly from said vibrator substantially axially of said filter element to the upper end thereof;

a platelike flange disposed radially in said casing at the upper end of said filter element, said upper end closure member having a bottom annular end in releasable nested relation with the open upper end of said casing intermediate portion, said upper end closure member and intermediate casing portion having opposed substantially radial surfaces receiving therebetween the outer peripheral portion of said flange in snugly sealed relation, said flange having an axial opening through which said open upper end of said filter element communicates with the interior of said upper closure member, the upper end of said filter element being snugly received in said flange axial opening and rigidly affixed to said flange for pendent support therefrom, a pair of passages in said flange opening radially through the flange periphery;

external supply and exhaust conduit extensions coupled through said radial passages to the upper ends of said supply and exhaust conduits in said casing, said nested portion of one of said upper closure member and intermediate casing portion including axially opening slots receiving said external conduit extensions and enabling release of said external conduit portions from said casing upon separation of said upper closure member from said casing intermediate portion, said external conduit extensions being respectively connectible to pressure fluid supply and exhaust means external of said casing;

said filter element comprising wound wire, coils of which have filtering spaces therebetween, to enable vibration of the lower end of such filter element by said vibrator with the upper end of said filter element rigidly fixed to said flange without degradation of the filter element metal;

whereby said filter element, conduits, vibrator and flange comprise a single integral unit insertible in and removable from said casing.

* * * * *